US012235622B2

(12) United States Patent
Onose

(10) Patent No.: US 12,235,622 B2
(45) Date of Patent: Feb. 25, 2025

(54) DATA COLLECTION DEVICE

(71) Applicant: FANUC CORPORATION, Yamanashi (JP)

(72) Inventor: Nao Onose, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 343 days.

(21) Appl. No.: 17/759,288

(22) PCT Filed: Jan. 19, 2021

(86) PCT No.: PCT/JP2021/001665
§ 371 (c)(1),
(2) Date: Jul. 22, 2022

(87) PCT Pub. No.: WO2021/149681
PCT Pub. Date: Jul. 29, 2021

(65) Prior Publication Data
US 2023/0104714 A1 Apr. 6, 2023

(30) Foreign Application Priority Data

Jan. 24, 2020 (JP) ................. 2020-010393

(51) Int. Cl.
G05B 19/4065 (2006.01)
(52) U.S. Cl.
CPC .......... G05B 19/4065 (2013.01); G05B 2219/50185 (2013.01)
(58) Field of Classification Search
None
See application file for complete search history.

(56) References Cited

U.S. PATENT DOCUMENTS

2007/0159321 A1 7/2007 Ogata et al.
2012/0155301 A1 6/2012 Miyazaki et al.
2015/0241859 A1 8/2015 Yabe et al.
(Continued)

FOREIGN PATENT DOCUMENTS

JP 2003114908 A 4/2003
JP 2005111637 A 4/2005
JP 2007-184754 A 7/2007
(Continued)

OTHER PUBLICATIONS

International Search Report in PCT/JP2021/001665, mailed Apr. 6, 2021. 2pp.

Primary Examiner — Sean Shechtman
(74) Attorney, Agent, or Firm — HAUPTMAN HAM, LLP

(57) ABSTRACT

A data collection device includes: a setting information storage unit storing setting information respectively associated with a plurality of cooperation levels set in accordance with a degree of cooperation with a higher system; a life-and-death monitoring unit monitoring a state of the cooperation with the higher system; a cooperation level determination unit determining the level of the cooperation with the higher system; a setting switching unit switching an operation setting of each function in accordance with the setting information corresponding to the cooperation level; a data collection unit collecting data in accordance with the operation setting switched by the setting switching unit; a data processing unit executing predetermined processing with respect to the data; and a data output unit outputting the data to a designated output destination.

4 Claims, 6 Drawing Sheets

(56) References Cited

U.S. PATENT DOCUMENTS

2015/0363240 A1 12/2015 Koizumi
2017/0262015 A1 9/2017 Li et al.

FOREIGN PATENT DOCUMENTS

| JP | 2012-129805 A | 7/2012 |
| JP | 2014-082703 A | 5/2014 |
| JP | 2016-225802 A | 12/2016 |
| JP | 2017191373 A | 10/2017 |
| JP | 2018-505577 A | 2/2018 |
| WO | 2014119719 A1 | 8/2014 |

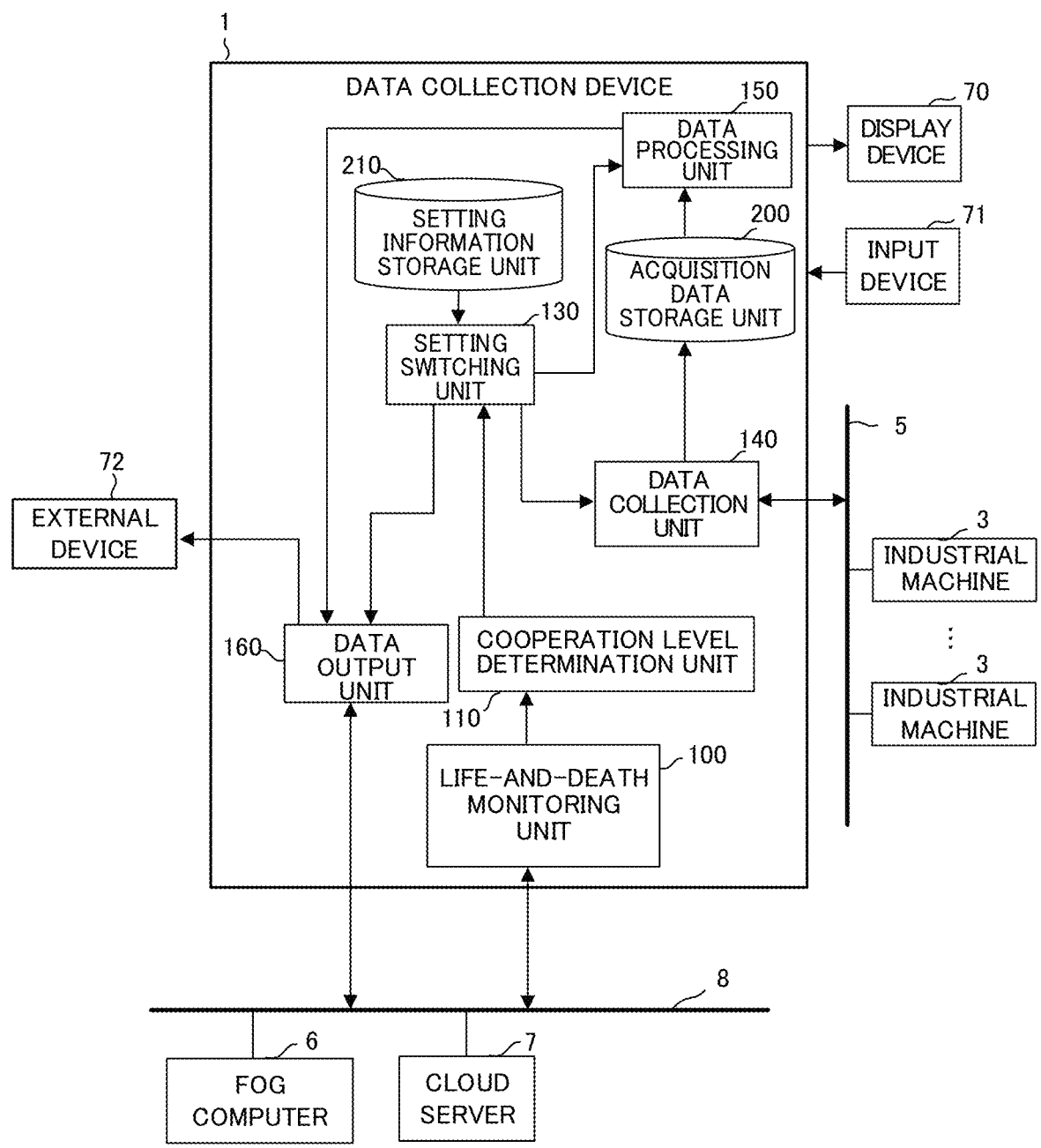

FIG. 3

| COOPERATION LEVEL | CONDITION | NOTE |
|---|---|---|
| LEVEL 1 | PACKET LOSS RATE 5% OR MORE | LOW COOPERATION RATE, TRANSMIT ONLY INFORMATION SHOWING OVERVIEW OF DATA COLLECTION TO HIGHER SYSTEM |
| LEVEL 2 | PACKET LOSS RATE 1% OR MORE AND LESS THAN 5% | MEDIUM COOPERATION RATE, TRANSMIT ONLY ESSENTIAL DATA TO HIGHER SYSTEM |
| LEVEL 3 | PACKET LOSS RATE LESS THAN 1% | HIGH COOPERATION RATE, TRANSMIT ALL DATA TO HIGHER SYSTEM |

FIG. 4

| COOPERATION LEVEL | SETTING |
|---|---|
| LEVEL 1 | ・PERFORM DATA COLLECTION<br>・COMPRESS COLLECTED DATA<br>・STORE IN USB MEMORY |
| LEVEL 2 | ・PERFORM DATA COLLECTION<br>・NOT PERFORM REDUCTION PROCESSING ON PARTIAL DATA RELATED TO PROCESSING OPERATION<br>・TRANSMIT PARTIAL DATA RELATED TO PROCESSING OPERATION TO HIGHER SYSTEM<br>・COMPRESS OTHER DATA<br>・STORE OTHER DATA IN USB MEMORY |
| LEVEL 3 | ・PERFORM DATA COLLECTION<br>・NOT PERFORM REDUCTION PROCESSING ON COLLECTED DATA<br>・TRANSMIT TO HIGHER SYSTEM |

FIG. 6

| | OPERATION STATE = IN PROCESSING | OPERATION STATE = ON STANDBY | OPERATION STATE = ABNORMALITY OCCURRENCE |
|---|---|---|---|
| COOPERATION LEVEL 1 LOW COOPERATION RATE | •PERFORM DATA COLLECTION<br>•COMPRESS DATA<br>•STORE IN USB MEMORY | •NOT PERFORM DATA COLLECTION | •PERFORM DATA COLLECTION<br>•COMPRESS DATA<br>•STORE IN USB MEMORY |
| COOPERATION LEVEL 2 MEDIUM COOPERATION RATE | •PERFORM DATA COLLECTION<br>•TRANSMIT PARTIAL DATA RELATED TO PROCESSING OPERATION TO HIGHER SYSTEM<br>•COMPRESS AND STORE IN USB MEMORY OTHER DATA | •PERFORM DATA COLLECTION ONLY ON ENVIRONMENT INFORMATION<br>•TRANSMIT COLLECTED DATA TO HIGHER SYSTEM | •PERFORM PARTIAL DATA COLLECTION<br>•PERFORM ANALYSIS PRE-PROCESSING SUCH AS FFT<br>•TRANSMIT TO HIGHER SYSTEM |
| COOPERATION LEVEL 3 HIGH COOPERATION RATE | •PERFORM DATA COLLECTION<br>•NOT PERFORM REDUCTION PROCESSING<br>•TRANSMIT TO HIGHER SYSTEM | •PERFORM DATA COLLECTION<br>•NOT PERFORM REDUCTION PROCESSING<br>•TRANSMIT TO HIGHER SYSTEM | •PERFORM DATA COLLECTION<br>•NOT PERFORM REDUCTION PROCESSING<br>•TRANSMIT TO HIGHER SYSTEM |

DATA COLLECTION DEVICE

RELATED APPLICATIONS

The present application is a National Phase of International Application No. PCT/JP2021/001665 filed Jan. 19, 2021, which claims priority to Japanese Application No. 2020-010393, filed Jan. 24, 2020.

TECHNICAL FIELD

The present invention relates to a data collection device.

BACKGROUND ART

At a manufacturing site where industrial machines such as machine tools are installed, a plurality of industrial machines are connected to a network and data collection is performed via the network. In such an environment, the roles of data processing are assigned by an edge computer collecting data from each industrial machine and a fog computer processing the data collected by the edge computer.

The edge computer and the fog computer can be rephrased as a lower system and a higher system, respectively.

There are various forms of cooperation between the lower system and the higher system described above. For example, there is a form in which data collection settings by the lower system are changed by the higher system as a main agent giving a command to the lower system. In addition, there is also a form in which the lower system as a main agent transmits collected data to the higher system in accordance with a predetermined setting. In another form, the lower system is connected to the higher system and data collection settings are downloaded from the higher system (for example, Patent Document 1 and so on). In this form, data collection conditions or the like set by the higher system can be easily applied to the lower system.

CITATION LIST

Patent Document

Patent Document 1: JP 2003-114908 A

SUMMARY OF THE INVENTION

Problem to be Solved by the Invention

For cooperation between the lower system and the higher system, resources on the lower system side such as communication have to be used in part. However, in a case where the lower system and the higher system do not cooperate, the resources allocated for cooperation are wasted as they are. In other words, in a situation in which mutual cooperation is impossible for some reason, for example, the communication interruption between the lower system and the higher system, it is necessary to improve the overall efficiency of the systems by allocating the resources used for cooperation for another purpose such as data collection so as not to waste the resources.

Meanwhile, in a case where a cooperation method is taken such that data accumulated when the lower system and the higher system are reconnected after disconnected once is collectively sent to the higher system, a lot of resources are required to collectively process a large amount of data. In such a case, the resource allocation needs to be changed again.

In view of such circumstances, there is a demand for a mechanism that enables flexible data collection and output in accordance with a cooperation state between lower and higher systems.

Means for Solving Problem

The data collection device according to the invention achieves the above object by including a function of determining whether or not to cooperate with respect to a request from a higher system, a function of switching data collection conditions, and a function of performing life-and-death monitoring to confirm whether or not cooperation is possible. In such device, a stable data collection service can be provided even in the event of a problem in the higher system.

A data collection device according to one aspect of the invention collects data from an industrial machine and outputs the data to a higher system. The data collection device includes: a setting information storage unit storing setting information respectively associated with a plurality of cooperation levels set in accordance with a degree of cooperation with the higher system; a life-and-death monitoring unit monitoring a state of the cooperation with the higher system; a cooperation level determination unit determining the level of the cooperation with the higher system based on a result of the monitoring by the life-and-death monitoring unit; a setting switching unit reading the setting information corresponding to the cooperation level determined by the cooperation level determination unit from the setting information storage unit and switching an operation setting of each function in accordance with the read setting information; a data collection unit collecting the data from the industrial machine in accordance with the operation setting switched by the setting switching unit; a data processing unit executing processing designated by the operation setting switched by the setting switching unit with respect to the data collected by the data collection unit; and a data output unit outputting the data processed by the data processing unit to an output destination designated by the operation setting switched by the setting switching unit.

EFFECT OF THE INVENTION

According to one aspect of the invention, when a lower system cooperates with the higher system, the life-and-death monitoring state of the higher system can be defined abstractively as a level, data collection settings or the like can be changed in accordance with the abstracted level, and thus data collection and cooperation with the higher system can be performed with stability.

BRIEF DESCRIPTION OF DRAWINGS

FIG. 2 is a schematic functional block diagram of a data collection device according to a first embodiment;

FIG. 3 is a diagram illustrating an example of a cooperation level;

FIG. 4 is a diagram illustrating an example of setting information stored in a setting information storage unit;

FIG. 6 is a diagram illustrating an example of setting information stored in a setting information storage unit.

DESCRIPTION OF EMBODIMENTS

Hereinafter, embodiments of the invention will be described with reference to the drawings.

Figure 1:
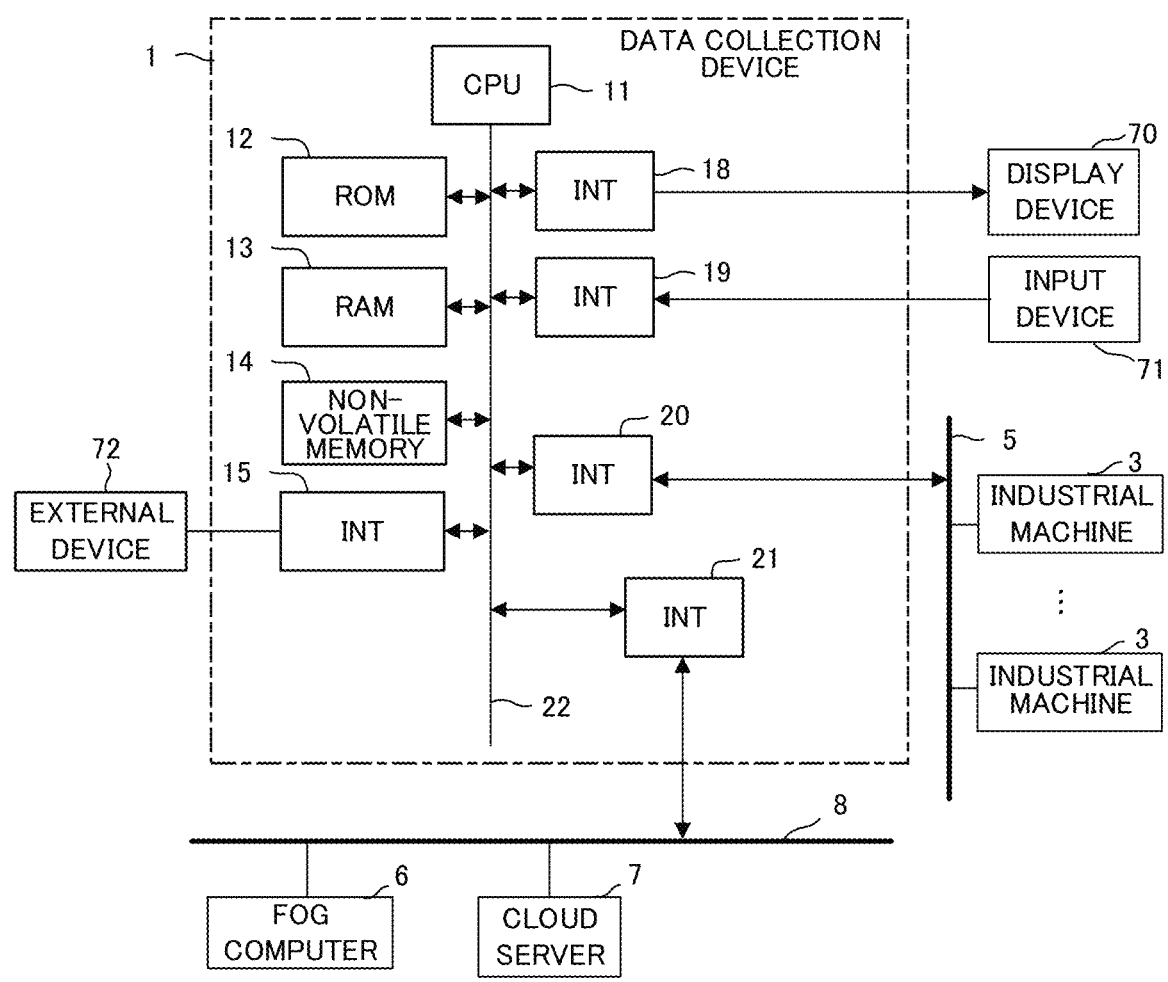
FIG. 1 is a schematic hardware configuration diagram of a data collection device according to one embodiment.

FIG. 1 is a schematic hardware configuration diagram illustrating a main part of a data collection device according to one embodiment of the invention. A data collection device 1 of the invention can be mounted on, for example, a personal computer, a fog computer, a cloud server, or the like connected to an industrial machine via a wired/wireless network. In the present embodiment, an example in which the data collection device 1 is mounted on a personal computer connected to an industrial machine via a wired/wireless network.

A CPU 11 of the data collection device 1 according to the present embodiment is a processor that controls the data collection device 1 as a whole. The CPU 11 reads out a system program stored in a ROM 12 via a bus 22 and controls the entire data collection device 1 in accordance with the system program. Temporarily stored in a RAM 13 are, for example, temporary calculation data and display data and various data input from the outside.

A non-volatile memory 14 is configured by a hard disk drive (HDD), a solid state drive (SSD), or the like. Data written in the non-volatile memory 14 is maintained in a storage state even when a power supply of the data collection device 1 is off. In the non-volatile memory 14, stored is, for example, data and a control program read from an external device 72 via an interface 15, data and a program input via an input device 71, data acquired from each industrial machine 3, and data acquired from each higher system such as a fog computer 6 and a cloud server 7. The data or program stored in the non-volatile memory 14 may be expanded in the RAM 13 when executed/used. In addition, various system programs such as a known analysis program are written in advance in the ROM 12.

The interface 15 is an interface for connecting the CPU 11 of the data collection device 1 and the external device 72 such as a USB device. Readable from the external device 72 side are, for example, a control program and each parameter used for controlling the industrial machine. In addition, the control program, each parameter, and the like edited in the data collection device 1 can be stored in external storage means via the external device 72 or transmitted via networks 5 and 8 to the industrial machine 3 and another computer such as the fog computer 6 and the cloud server 7.

Each data read onto the memory, data obtained as a result, for example, of the execution of the control program or system program, and the like are output via an interface 18 and displayed on a display device 70. In addition, the input device 71 configured by a keyboard, a pointing device, and so on passes, for example, a command and data based on an operation by a worker to the CPU 11 via an interface 19.

Interfaces 20 and 21 are interfaces for connecting the CPU 11 of the data collection device 1 and the wired or wireless networks 5 and 8. The industrial machine 3 (or a controller that controls the industrial machine 3) is connected to the network 5, and mutual data exchange is performed in relation to the data collection device 1. In addition, the fog computer 6, the cloud server 7, and the like are connected to the network 8, and mutual data exchange is performed in relation to the data collection device 1. It should be noted that the networks 5 and 8 may be the same network.

FIG. 2 illustrates the functions of the data collection device 1 according to a first embodiment of the invention as a schematic block diagram. Each function of the data collection device 1 according to the present embodiment is realized by the CPU 11 of the data collection device 1 illustrated in FIG. 1 executing a system program and controlling the operation of each part of the data collection device 1.

The data collection device 1 of the present embodiment includes a life-and-death monitoring unit 100, a cooperation level determination unit 110, a setting switching unit 130, a data collection unit 140, a data processing unit 150, and a data output unit 160. In addition, an acquisition data storage unit 200 that is a region where data acquired from the industrial machine 3 is stored and a setting information storage unit 210 that is a region where a setting related to the operation of each function corresponding to a cooperation level is stored in advance are provided on the RAM 13 or the non-volatile memory 14.

The life-and-death monitoring unit 100 is realized by the CPU 11 of the data collection device 1 illustrated in FIG. 1 executing a system program read from the ROM 12 and arithmetic processing using the RAM 13 and the non-volatile memory 14 and input/output processing using the interface 21 being performed mainly by the CPU 11. The life-and-death monitoring unit 100 monitors the state of cooperation with the higher system that collects data in cooperation with the data collection device 1 such as the fog computer 6 and the cloud server 7 (operation state of the higher system and state of communication with the higher system). The life-and-death monitoring unit 100 transmits and receives, for example, a communication packet having a periodically determined data length to and from the higher system (using, for example, a ping test) and monitors the state of cooperation with the higher system based on the communication status. In addition, the life-and-death monitoring unit 100 may grasp the status of data transmission to the higher system by the data output unit 160 (using, for example, Wireshark, tcpdump, or the like) and monitor the state of cooperation with the higher system. The state of cooperation with the higher system monitored by the life-and-death monitoring unit 100 is output to the cooperation level determination unit 110.

The cooperation level determination unit 110 is realized by the CPU 11 of the data collection device 1 illustrated in FIG. 1 executing a system program read from the ROM 12 and arithmetic processing using the RAM 13 and the non-volatile memory 14 being performed mainly by the CPU 11. The cooperation level determination unit 110 determines the cooperation level in accordance with the state of cooperation with the higher system. Conditions for the cooperation level determination are defined in advance in a predetermined region of the RAM 13 to the non-volatile memory 14 of the data collection device 1. The cooperation level determination unit 110 determines the current cooperation level based on the conditions for the cooperation level determination and the state of cooperation with the higher system monitored by the life-and-death monitoring unit 100. The cooperation level determination unit 110 may determine the cooperation level based on, for example, the status of communication with the higher system monitored by the life-and-death monitoring unit 100. FIG. 3 illustrates an example of the conditions for the cooperation level determination. In the example illustrated in FIG. 3, each cooperation level is associated with a packet loss rate condition for determining the cooperation level. In addition to this, the conditions for the cooperation level determination may include the status of time required for transmission (delay), jitter, or the like.

The setting switching unit 130 is realized by the CPU 11 of the data collection device 1 illustrated in FIG. 1 executing a system program read from the ROM 12 and arithmetic processing using the RAM 13 and the non-volatile memory 14 being performed mainly by the CPU 11. The setting switching unit 130 switches settings related to data collection from the industrial machine 3 and the transmission of collected data based on the cooperation level determined by the cooperation level determination unit 110. In the setting information storage unit 210, setting information defining the operation of each function is stored in advance in association with each cooperation level. The setting switching unit 130 reads the setting information corresponding to the current cooperation level from the setting information storage unit 210 and sets the operation of each function. Examples of the operation of each function that can be set include the selection of a data item acquired from the industrial machine 3, the cycle of data acquisition from the industrial machine 3, the selection of a transmission or storage destination of acquired data, and data processing for acquired data (such as compression and thinning).

FIG. 4 illustrates an example of the setting information stored in the setting information storage unit 210. In a case where the setting information exemplified in FIG. 4 is stored and the cooperation level is, for example, 3 (high rate of cooperation with the higher system), the setting switching unit 130 acquires collection target data from the industrial machine 3 and performs setting to transmit all the acquired data to the higher system. In addition, in a case where the cooperation level is, for example, 2 (medium rate of cooperation with the higher system), the setting switching unit 130 acquires collection target data from the industrial machine 3 and sets each function such that machining operation-related data (for example, spindle rotation speed and shaft movement speed) are transmitted to the higher system and the other data are compressed and stored in a USB memory via the external device 72. Further, in a case where the cooperation level is, for example, 1 (low rate of cooperation with the higher system), the setting switching unit 130 sets each function such that collection target data are acquired from the industrial machine 3 and stored in the USB memory via the external device 72.

The data collection unit 140 is realized by the CPU 11 of the data collection device 1 illustrated in FIG. 1 executing a system program read from the ROM 12 and arithmetic processing using the RAM 13 and the non-volatile memory 14 and input/output processing using the interface 20 being performed mainly by the CPU 11. The data collection unit 140 collects data from the industrial machine 3 that is a data collection target based on the setting by the setting switching unit 130. The data related to the industrial machine 3 and collected by the data collection unit 140 may be, for example, information acquirable from the controller of the industrial machine 3 (for example, spindle rotation speed, shaft position, movement speed, acceleration, alarm information generated by the industrial machine 3, and information set in the industrial machine 3 by an operator). In addition, the data related to the industrial machine 3 and collected by the data collection unit 140 may be a value detected by a sensor installed in the environment of the industrial machine 3 (for example, environmental temperature of the industrial machine 3, vibration generated in the industrial machine 3, and sound generated in the industrial machine 3). The data collected by the data collection unit 140 are stored in the acquisition data storage unit 200.

The data processing unit 150 is realized by the CPU 11 of the data collection device 1 illustrated in FIG. 1 executing a system program read from the ROM 12 and arithmetic processing using the RAM 13 and the non-volatile memory 14 being performed mainly by the CPU 11. The data processing unit 150 performs data processing on the data collected from the industrial machine 3 by the data processing unit 150 based on the setting by the setting switching unit 130. The data processing performed by the data collection unit 140 may be lossless or lossy data volume reduction processing (for example, data compression, data thinning, predetermined statistical processing, conversion processing such as FFT, and image data conversion processing (still image compression such as JPEG and video compression such as MPEG)). In addition, the data processing performed by the data collection unit 140 may be preprocessing performed in analyzing collected data.

The data output unit 160 is realized by the CPU 11 of the data collection device 1 illustrated in FIG. 1 executing a system program read from the ROM 12 and arithmetic processing using the RAM 13 and the non-volatile memory 14 and input/output processing using the interfaces 15 and 21 being performed mainly by the CPU 11. The data output unit 160 outputs the data collected from the industrial machine 3 based on the setting by the setting switching unit 130. The data output unit 160 may transmit and output the data collected from the industrial machine 3 to the higher system such as the fog computer 6 and the cloud server 7 via, for example, the network 8 or record and output the data to a USB memory or the like via the external device 72. The destination of the data output by the data output unit 160 is not limited to the higher system and the USB memory. The destination may be appropriately set in association with the cooperation level, examples of which include a network storage server for temporary storage different from the higher system and a predetermined region provided in the non-volatile memory 14 of the data collection device 1.

The data collection device 1 configured as described above abstracts the life-and-death monitoring state of the higher system as a level in cooperating with the higher system and is capable of changing, for example, data collection settings. Accordingly, flexible data collection and output can be performed even in a situation in which no communication or the like can be performed with the higher system, and data collection and cooperation with the higher system can be performed with stability.

Figure 5:
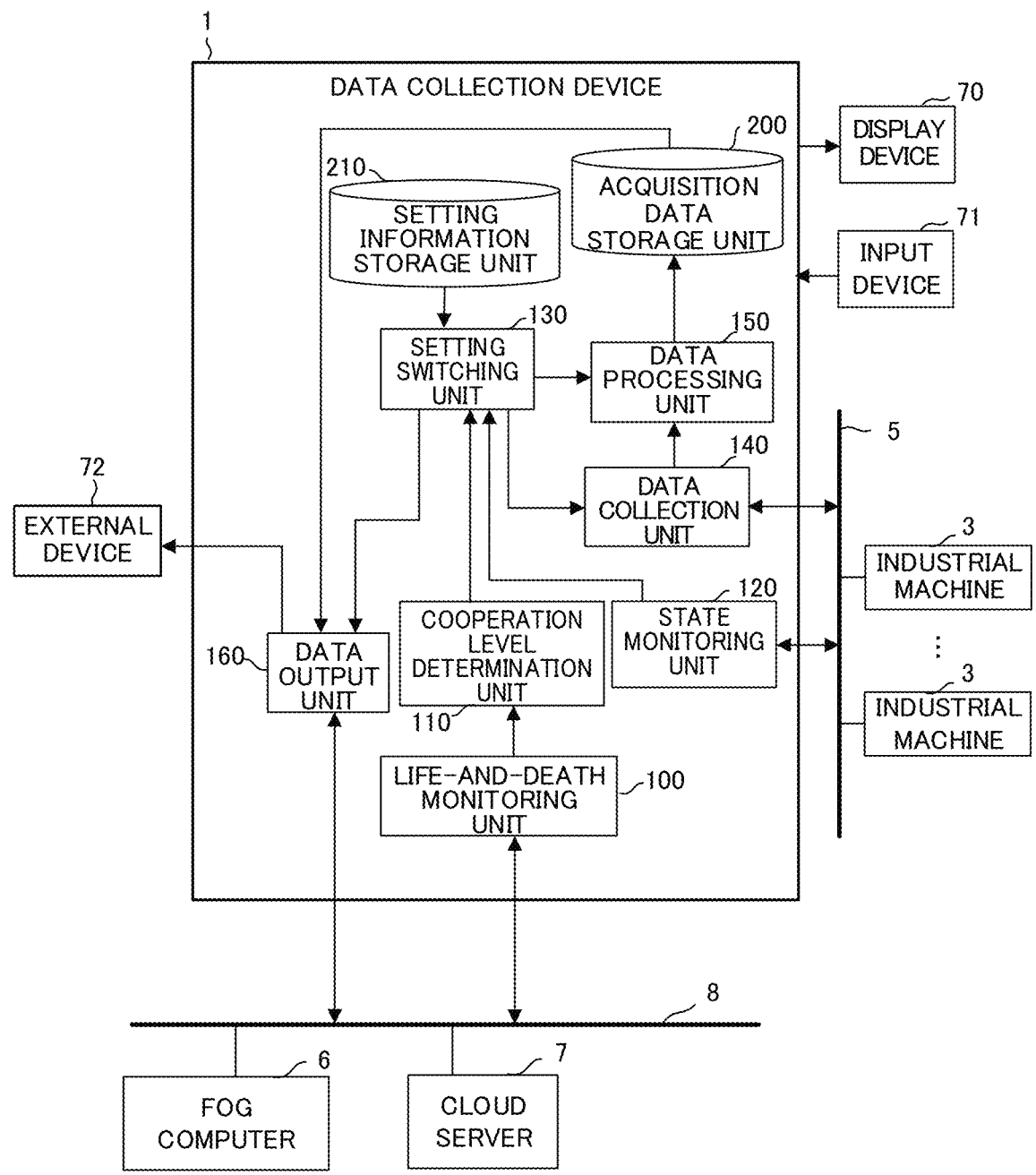
FIG. 5 is a schematic functional block diagram of a data collection device according to a second embodiment.

FIG. 5 illustrates the functions of the data collection device 1 according to a second embodiment of the invention as a schematic block diagram. Each function of the data collection device 1 according to the present embodiment is realized by the CPU 11 of the data collection device 1 illustrated in FIG. 1 executing a system program and controlling the operation of each part of the data collection device 1.

The data collection device 1 of the present embodiment further includes a state monitoring unit 120 in addition to the functions of the data collection device 1 according to the first embodiment.

The state monitoring unit 120 is realized by the CPU 11 of the data collection device 1 illustrated in FIG. 1 executing a system program read from the ROM 12 and arithmetic processing using the RAM 13 and the non-volatile memory 14 and input/output processing using the interface 20 being performed mainly by the CPU 11. The state monitoring unit 120 monitors the industrial machine 3 that is a data collection target and specifies the operation state thereof. The state monitoring unit 120 may, for example, make an operation state inquiry with respect to the industrial machine 3 and specify the operation state of the industrial machine 3 from the response content. In addition, the state monitoring unit 120 may specify the operation state of the industrial machine 3 from the content of the data collected from the industrial machine 3.

Conditions for specifying the operation state of the industrial machine 3 are defined in advance in a predetermined region of the RAM 13 to the non-volatile memory 14 of the data collection device 1. As an example, the state monitoring unit 120 may determine that the industrial machine 3 is in the process of machining operation in a case where no alarm or the like is generated in the industrial machine 3, data of a shaft speed or a spindle rotation speed exceeding 0 is acquired from the industrial machine 3, and vibration exceeding a predetermined amplitude value and a predetermined frequency value is generated. As another example, the state monitoring unit 120 may determine that the industrial machine 3 is on standby in a case where the shaft speed or the spindle rotation speed is 0 in the industrial machine 3. In addition, at this time, in a case where an alarm or the like is generated in the industrial machine 3, the state monitoring unit 120 may determine that an abnormality is occurring.

The setting switching unit 130 according to the present embodiment switches settings related to data collection from the industrial machine 3 and the transmission of collected data by further taking into consideration the operation state of the industrial machine 3 specified by the state monitoring unit 120 in addition to the cooperation level determined by the cooperation level determination unit 110. In the setting information storage unit 210, setting information defining the operation of each function is stored in advance in association with each cooperation level and the operation state of the industrial machine 3. The setting switching unit 130 reads the setting information corresponding to the current cooperation level and the operation state of the industrial machine 3 from the setting information storage unit 210 and sets the operation of each function. Each function that can be set includes, for example, whether or not to collect data from the industrial machine 3, the selection of a data item acquired from the industrial machine 3, the cycle of data acquisition from the industrial machine 3, the selection of a transmission or storage destination of acquired data, and data processing for acquired data (such as compression and thinning).

FIG. 6 illustrates an example of the setting information stored in the setting information storage unit 210. In a case where the setting information exemplified in FIG. 6 is stored and the cooperation level is, for example, 3, the setting switching unit 130 collects collection target data from the industrial machine 3 and performs setting to transmit all the acquired data to the higher system. In addition, in a case where the cooperation level is, for example, 1 and the industrial machine 3 is on standby, the setting switching unit 130 performs setting so as not to perform data collection from the industrial machine 3 itself and not to waste resources. Further, in a case where the cooperation level is, for example, 2 and the industrial machine 3 is above, the setting switching unit 130 performs setting to collect only the data required in the event of a partial abnormality from the industrial machine 3, perform analysis pre-processing using the resources freed by the reduced amount of data collection with respect to the collected data, and transmit the processed data to the higher system.

The data collection device 1 according to the present embodiment abstracts the life-and-death monitoring state of the higher system as a level in cooperating with the higher system and is capable of changing, for example, data collection settings in accordance with the combination with the state of the industrial machine 3 that is a data collection target. Accordingly, the resources of the higher system, network, and data collection device 1 can be effectively utilized, and data collection and cooperation with the higher system can be performed with stability.

Figure 7:
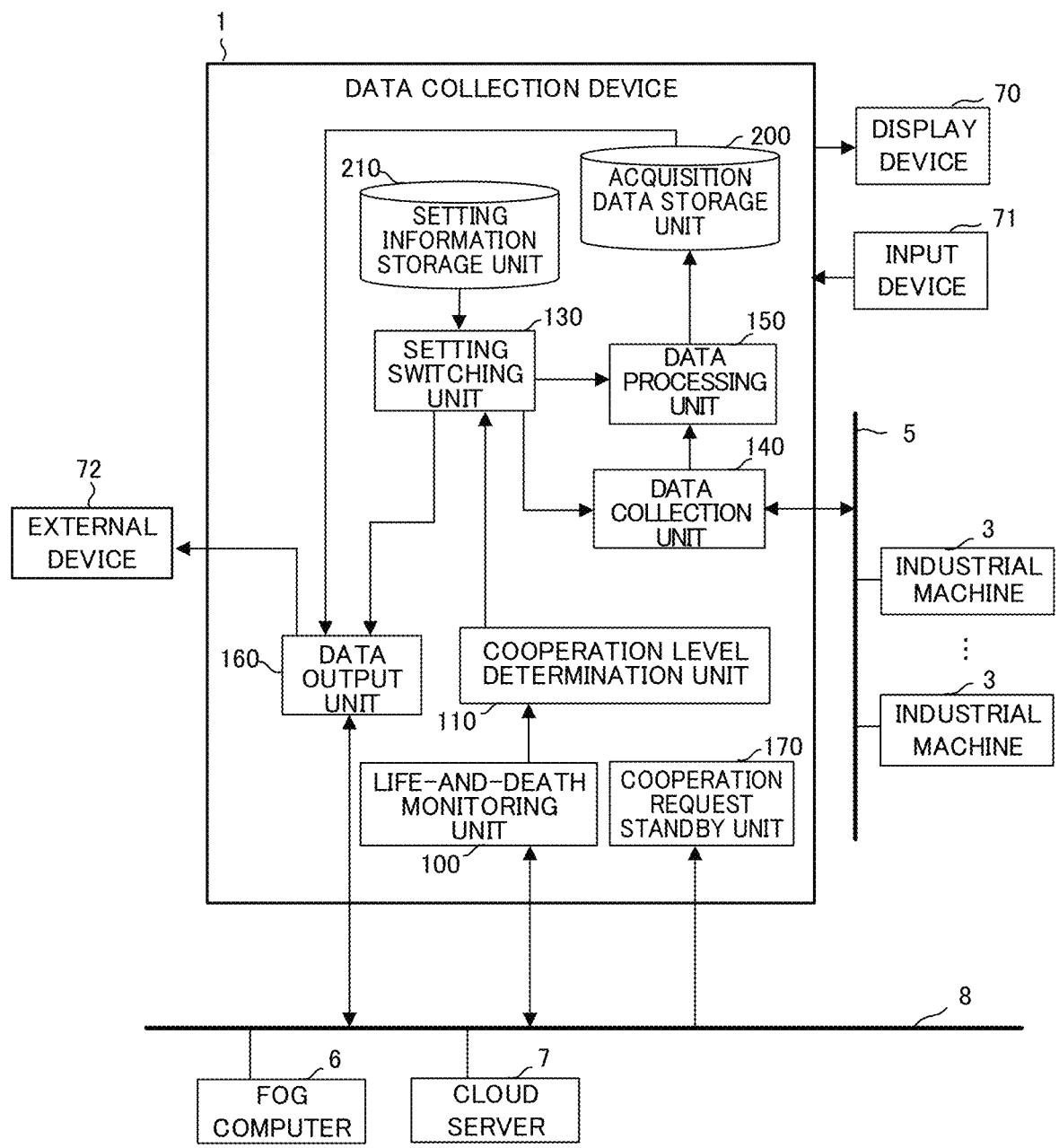
FIG. 7 is a schematic functional block diagram of a data collection device according to a third embodiment.

FIG. 7 illustrates the functions of the data collection device 1 according to a third embodiment of the invention as a schematic block diagram. Each function of the data collection device 1 according to the present embodiment is realized by the CPU 11 of the data collection device 1 illustrated in FIG. 1 executing a system program and controlling the operation of each part of the data collection device 1.

The data collection device 1 of the present embodiment further includes a cooperation request standby unit 170 in addition to the functions of the data collection devices 1 according to the first and second embodiments. It should be noted that FIG. 7 illustrates a configuration in which the cooperation request standby unit 170 is added to the data collection device 1 according to the first embodiment.

The data collection device 1 of the present embodiment has a plurality of operation modes. One of the plurality of operation modes is a single operation mode in which the data collection device 1 independently collects data and stores the collected data in an internal or external memory without cooperating with the higher system. In addition, the other one of the plurality of operation modes is a cooperative operation mode in which the data collection device 1 cooperates with the higher system and collected data is transmitted to the higher system when the cooperation is sufficient.

The cooperation request standby unit 170 is realized by the CPU 11 of the data collection device 1 illustrated in FIG. 1 executing a system program read from the ROM 12 and arithmetic processing using the RAM 13 and the non-volatile memory 14 and input/output processing using the interfaces 15 and 21 being performed mainly by the CPU 11. The cooperation request standby unit 170 waits for a cooperation request from the higher system and, in a case where there is a cooperation request from the higher system, switches the data collection device 1 to the cooperative operation mode. In addition, the cooperation request standby unit 170 switches the data collection device 1 to the single operation mode in a case where a cooperation end request is received from the higher system. In the cooperative operation mode, the data collection device 1 operates in the same manner as the data collection devices 1 according to the first and second embodiments.

As for the data collection device 1 according to the present embodiment, the cooperation between the higher system and the data collection device 1 can be controlled from the higher system and the cooperative operation is performed only when necessary. As a result, wasteful resource consumption is prevented and data collection and cooperation with the higher system can be performed with stability.

Although one embodiment of the invention has been described above, the invention is not limited to the only examples of the above embodiment and can be implemented in various aspects by making appropriate changes.

For example, although the operation of the data collection device 1 described in the above embodiment assumes three cooperation levels and three states of the industrial machine 3, there may be 4 or more fine cooperation levels depending on the degree of cooperation and the state of the industrial machine 3 may also be distinguished in more detail.

EXPLANATIONS OF LETTERS OR NUMERALS

1 DATA COLLECTION DEVICE
3 INDUSTRIAL MACHINE
5, 8 NETWORK
6 FOG COMPUTER
7 CLOUD SERVER
11 CPU
12 ROM
13 RAM
14 NON-VOLATILE MEMORY
15, 18, 19, 20, 21 INTERFACE
22 BUS
70 DISPLAY DEVICE
71 INPUT DEVICE
72 EXTERNAL DEVICE
100 LIFE-AND-DEATH MONITORING UNIT
110 COOPERATION LEVEL DETERMINATION UNIT
120 STATE MONITORING UNIT
130 SETTING SWITCHING UNIT
140 DATA COLLECTION UNIT
150 DATA PROCESSING UNIT
160 DATA OUTPUT UNIT
170 COOPERATION REQUEST STANDBY UNIT
200 ACQUISITION DATA STORAGE UNIT
210 SETTING INFORMATION STORAGE UNIT

The invention claimed is:

1. A data collection device configured to, via a computer communication network, collect data from an industrial machine and output the data to a higher system, the data collection device comprising:
a setting information storage unit storing setting information respectively associated with a plurality of cooperation levels set in accordance with a degree of cooperation with the higher system;
a life-and-death monitoring unit monitoring a state of the cooperation with the higher system via the computer communication network;
a cooperation level determination unit determining a cooperation level of the plurality of cooperation levels with the higher system based on the state of the cooperation with the higher system;
a setting switching unit
reading the setting information corresponding to the cooperation level determined by the cooperation level determination unit from the setting information storage unit and
switching an operation setting of each function in accordance with the read setting information to allocate resources for cooperation with the higher system;
a data collection unit collecting the data from the industrial machine via the computer communication network in accordance with the operation setting switched by the setting switching unit;
a data processing unit executing processing, designated by the operation setting switched by the setting switching unit, on the data collected by the data collection unit, by using the resources allocated for cooperation with the higher system; and
a data output unit outputting the data processed by the data processing unit via the computer communication network to an output destination including the higher system designated by the operation setting switched by the setting switching unit.

2. The data collection device according to claim 1, wherein
the setting information stored in the setting information storage unit is further associated with a plurality of operation states of the industrial machine,
the data collection device further comprises a state monitoring unit monitoring each of the plurality of operation states of the industrial machine, and
the setting switching unit
reads the setting information corresponding to the cooperation level determined by the cooperation level determination unit and an operation state of the plurality of operation states of the industrial machine specified by the state monitoring unit from the setting information storage unit and
switches the operation setting of each function in accordance with the read setting information.

3. The data collection device according to claim 1, wherein
the data collection device comprises a plurality of operation modes including at least a single operation mode and a cooperative operation mode,
at least the setting switching unit functions in the cooperative operation mode, and
the data collection device further comprises a cooperation request standby unit waiting for a cooperation request from the higher system and switching the operation mode to the cooperative operation mode in response to the cooperation request being received.

4. The data collection device according to claim 1, wherein an operation of the function in which the setting switching unit switches the operation setting includes at least one of whether or not to perform data collection from the industrial machine, selection of a data item acquired from the industrial machine, a cycle of data acquisition from the industrial machine, selection of a transmission or storage destination of acquired data, or data processing including compression or thinning of the acquired data.

* * * * *